(12) United States Patent
Rodgers

(10) Patent No.: US 7,232,477 B2
(45) Date of Patent: Jun. 19, 2007

(54) ENVIRONMENTAL CONTINUOUS AIR MONITOR INLET WITH COMBINED PRESEPARATOR AND VIRTUAL IMPACTOR

(75) Inventor: John C. Rodgers, Santa Fe, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 338 days.

(21) Appl. No.: 10/967,568

(22) Filed: Oct. 18, 2004

(65) Prior Publication Data

US 2006/0080948 A1    Apr. 20, 2006

(51) Int. Cl.
*B01D 45/00* (2006.01)
(52) U.S. Cl. .................. 96/413; 55/318; 55/458; 55/DIG. 14; 73/863.22; 95/32; 95/267
(58) Field of Classification Search .......... 55/DIG. 14, 55/315, 318, 462, 465, 468, 434; 96/389, 96/413; 95/29, 31, 32, 267, 271; 73/863.22
See application file for complete search history.

(56) References Cited

U.S. PATENT DOCUMENTS

| | | | |
|---|---|---|---|
| 4,132,894 A |   | 1/1979 | Yule |
| 4,301,002 A | * | 11/1981 | Loo ............ 209/143 |
| 4,311,002 A |   | 1/1982 | Hoffmann |
| 4,321,822 A |   | 3/1982 | Marple |
| 4,452,068 A |   | 6/1984 | Loo |
| 4,461,183 A | * | 7/1984 | Wedding ........ 73/863.21 |
| 4,670,135 A |   | 6/1987 | Marple |
| 6,530,287 B1 | * | 3/2003 | Rodgers .......... 73/863.21 |
| 6,698,592 B2 |   | 3/2004 | Kenning |

OTHER PUBLICATIONS

Thomas J. Yule, "An On-Line Monitor For Alpha-Emitting Aerosols," IEEE Transactions on Nuclear Science, vol. NS-25, No. 1, pp. 762-766, Feb. 1978.

* cited by examiner

Primary Examiner—Duane Smith
Assistant Examiner—Sonji Turner
(74) Attorney, Agent, or Firm—Milton D. Wyrick; Mark N. Fitzgerald; Holly L. Teeter

(57) ABSTRACT

An inlet for an environmental air monitor is described wherein a pre-separator interfaces with ambient environment air and removes debris and insects commonly associated with high wind outdoors and a deflector plate in communication with incoming air from the pre-separator stage, that directs the air radially and downward uniformly into a plurality of accelerator jets located in a manifold of a virtual impactor, the manifold being cylindrical and having a top, a base, and a wall, with the plurality of accelerator jets being located in the top of the manifold and receiving the directed air and accelerating directed air, thereby creating jets of air penetrating into the manifold, where a major flow is deflected to the walls of the manifold and extracted through ports in the walls. A plurality of receiver nozzles are located in the base of the manifold coaxial with the accelerator jets, and a plurality of matching flow restrictor elements are located in the plurality of receiver nozzles for balancing and equalizing the total minor flow among all the plurality of receiver nozzles, through which a lower, fractional flow extracts large particle constituents of the air for collection on a sample filter after passing through the plurality of receiver nozzles and the plurality of matching flow restrictor elements.

7 Claims, 3 Drawing Sheets

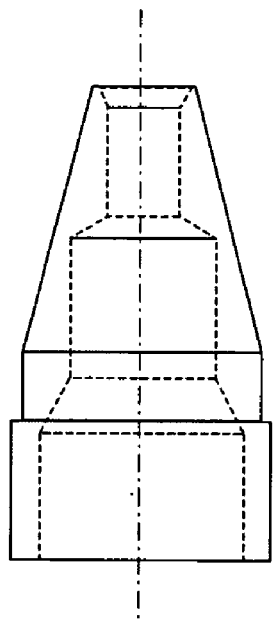 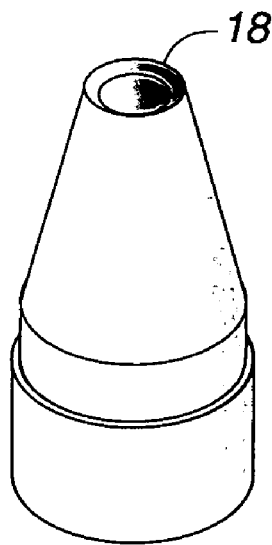 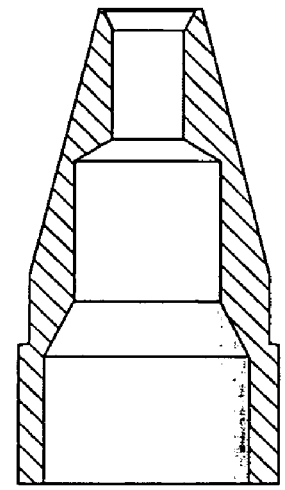
Fig. 3a  Fig. 3b  Fig. 3c
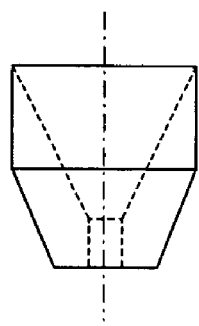 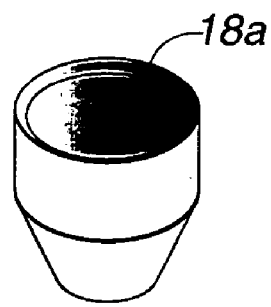 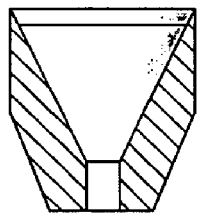
Fig. 4a  Fig. 4b  Fig. 4c

ENVIRONMENTAL CONTINUOUS AIR MONITOR INLET WITH COMBINED PRESEPARATOR AND VIRTUAL IMPACTOR

The present invention generally relates to environmental continuous air monitors, and, more specifically relates to environmental air monitor inlets used in adverse environmental conditions. This invention was made with Government support under Contract No. W-7405-ENG-36 awarded by the U.S. Department of Energy. The Government has certain rights in the invention.

BACKGROUND OF THE INVENTION

Environmental continuous air monitors (ECAMs) are becoming much more important to National defense programs in light of recent world events. The specter of the use of "dirty" nuclear devices or radiological dispersal devices (RDDs) by terrorists has become a real possibility. To handle the consequences of such attacks, high volume environmental continuous air monitors must be reliable, and provide service over long periods of time without requiring frequent maintenance. However, a problem with current environmental continuous air monitor designs is that sampled ambient air may contain large quantities of fine particles (particles in the size range less than about 2.5 micrometers aerodynamic diameter) and smoke particles (particle diameters of between about 0.1-1.0 micrometers), which can cause rapid filter clogging and subsequent premature shutdown. This is especially true of ambient atmospheres in the aftermath of RDD explosions or associated fires. It has been found that in the case of field vegetation burning, for example, that over 80% of the total suspended particulates have sizes of 1 micrometer or less in diameter. It has long been recognized that fine and smoke sized particles cause rapid clogging of the pore structures and, understandably, sampling at high volumetric rates accelerates dust loading of the sample filter and, where smoke or fine dusts are involved, filter clogging and sampling failure. This frequent shutdown and need for replacement of filters, is time consuming and expensive, and necessarily can interrupt an important monitoring and consequence management process.

Fine particulates exist naturally in many environments as well as a result of explosions. Among these are the very smoky conditions that develop in the vicinity of forest and range fires where fires and smoke are principal constituents of the ambient aerosol load. Elsewhere, energetic disturbances of soil that can accompany earth moving and construction activities can create high dust loads containing a large fraction of fines, and smoke particles are copiously generated by internal combustion engines, especially diesel engines. These conditions can quickly cause a prior art environmental continuous air monitor rapidly to experience clogged filters and a subsequent shut down of operation.

The present invention addresses the problem of rapid plugging of filters in high volume ambient continuous air monitors by selectively removing debris and fine particle components in the sampled ambient air before it passes through the sample collection filter, while at the same time, capturing the larger size particles that would be expected to contain the material of concern, such as the radioactive constituents in a radiological dispersal device (RDD) mixed in with fine dusts and smoke.

In order to achieve the objects and purposes of the present invention, and in accordance with its objectives, an inlet apparatus for removal of materials that preclude sustained, low maintenance operation comprises a pre-separator stage for eliminating suspended debris at the input to the system that might damage or degrade the performance of subsequent inlet stages, followed by a multiple nozzle virtual impactor stage having a 50% cut-point of about 2 micrometers aerodynamic diameter for removal without filtration of 90% or more of the fine particle and smoke constituents in the sampled air. Extracted environmental air passing through the pre-separator stage often contains re-suspended debris (leaves, flying insects, etc) that can be removed by inertial separation techniques to be deposited in traps, and then, upon exiting the throat of the first stage, passes over a deflector plate in a transition zone into a second stage consisting of a multiple nozzle dichotomous virtual impactor. Here in a third stage, the fine fraction of aerosol are removed and discarded without filtration, thereby achieving the objective of reducing the rate at which filter performance degrades. At the same time, nearly all of the larger size particles are transported to the filter and collected.

SUMMARY OF THE INVENTION

In order to achieve the objects and purposes of the present invention, and in accordance with its objectives, an inlet for an environmental air monitor comprises a pre-separator stage interfacing with ambient environment air and removing debris and insects commonly associated with high wind outdoors with a deflector plate in communication with incoming air from the pre-separator stage, that directs the air radially and downward uniformly into a plurality of accelerator jets located in a manifold of a virtual impactor, the manifold being cylindrical and having a top, a base, and a wall, with the plurality of accelerator jets being located in the top of the manifold and receiving the directed air and accelerating directed air, thereby creating jets of air penetrating into the manifold, where a major flow is deflected to the walls of the manifold and extracted through ports in the walls. A plurality of receiver nozzles are located in the base of the manifold coaxial with the accelerator jets, and a plurality of matching flow restrictor elements are located in the plurality of receiver nozzles for balancing and equalizing the total minor flow among all the plurality of receiver nozzles, through which a lower, fractional flow extracts large particle constituents of the air for collection on a sample filter after passing through the plurality of receiver nozzles and the plurality of matching flow restrictor elements.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings:

FIGS. 3a, 3b, and 3c show various views of the receiver nozzles of the virtual impactor of the present invention.

FIGS. 4a, 4b, and 4c show various views of the flow restrictor elements of the virtual impactor of the present invention.

DETAILED DESCRIPTION

The present invention provides apparatus that is positioned in the airflow path of a high volume environmental continuous air monitor ahead of the sample collection stage to remove potentially interfering and clogging particles in the collected air. The invention may be understood most easily through reference to the drawings.

Figure 1:
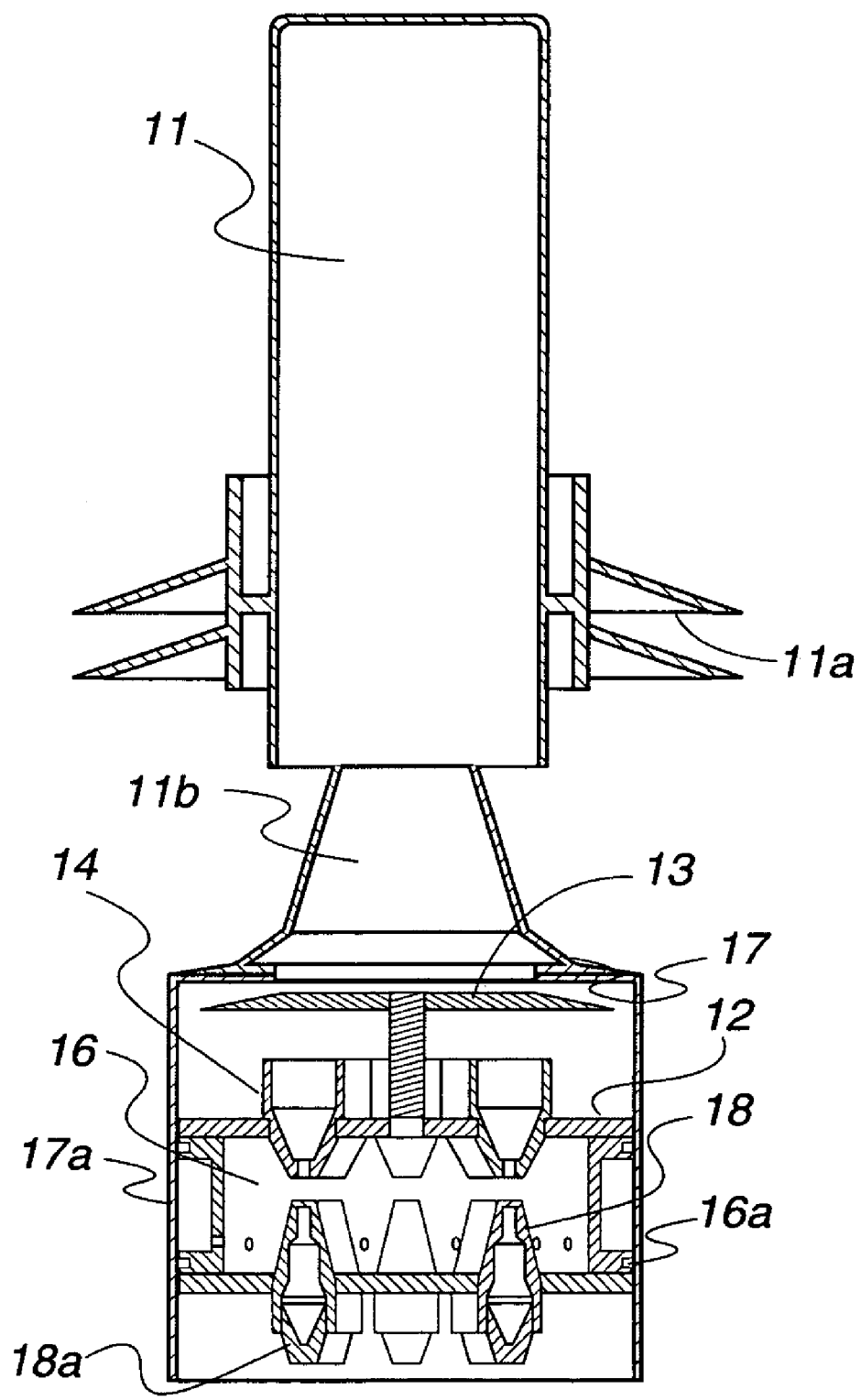
FIG. 1 is a cross-sectional view of the present invention including a representative pre-separator mated with the virtual impactor section.
Figures 2A, 2B:
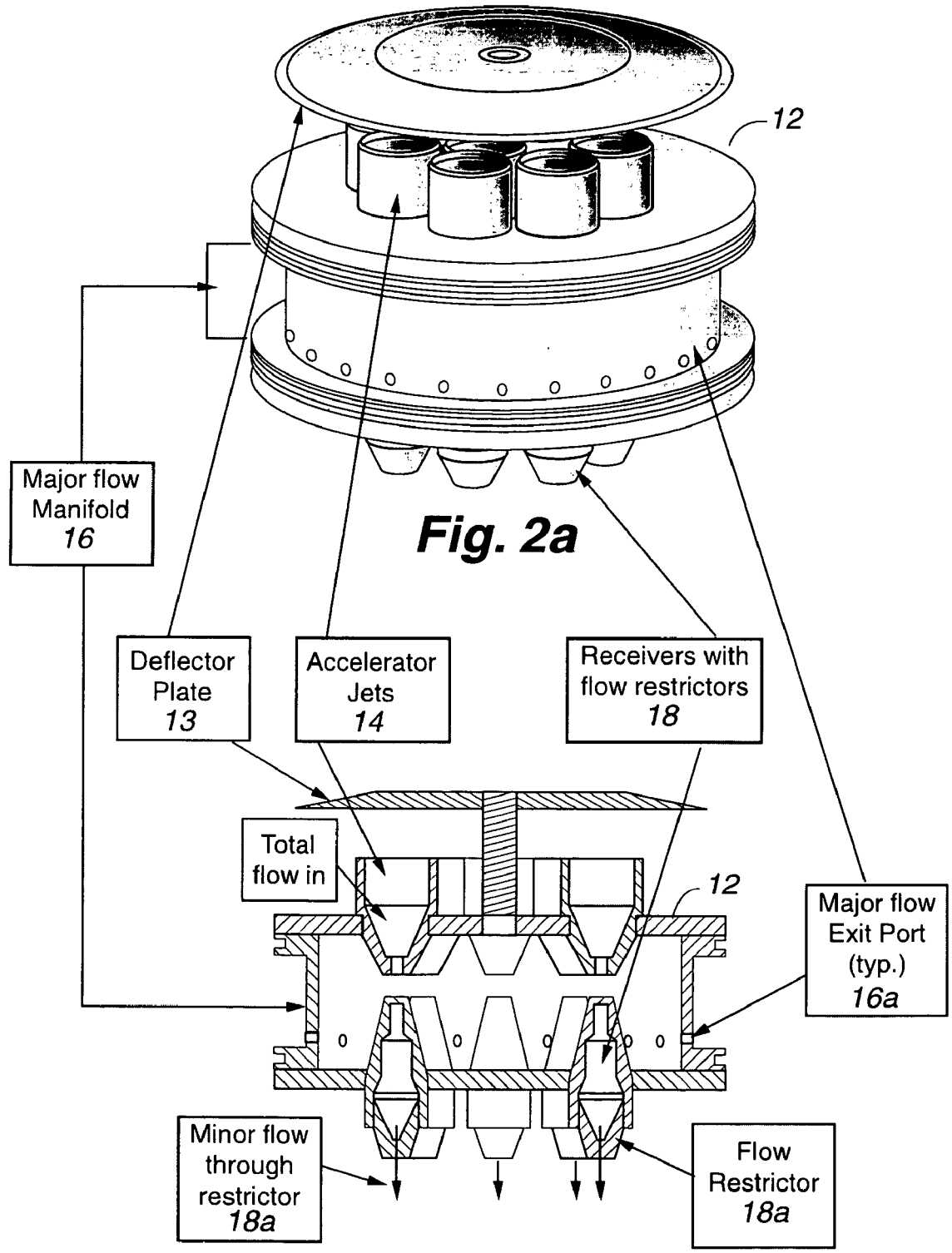
FIG. 2a is a perspective illustration of the virtual impactor section of the present invention.
FIG. 2b is a cross-sectional view the virtual impactor section of the present invention.

Referring first to FIG. 1, a cross-sectional view of one embodiment of the present invention is shown. Pre-separator 11 may be any of numerous acceptable pre-separators, but in FIG. 1 a cyclo-shroud type pre-separator (U.S. Pat. No. 6,530,287) is shown. The requirements of pre-separator 11 are that it buffer the inlet of a continuous air monitor against the sometime high velocity, dust-laden ambient air input through inlets 11a. The resultant inertial and drag effects on pieces of airborne debris or insects that are carried into the inlet and then subjected to strong cyclonic or centrifugal forces, causes such debris to be removed and trapped before it can move on into the filter of a continuous air monitor.

In practice, the design of the pre-separator 11 should be such that only particulate matter that is about 10-15 micrometers aerodynamic diameter is passed on to the next stage of the apparatus. Inasmuch as the present invention is a two-stage device consisting of a pre-separator stage followed immediately by dichotomous virtual impaction separation stage 12, a transition region 11b exists between stages where the outlet flow from the pre-separator 11 is diverted radially and then down uniformly into the input level of virtual impactor stage 12.

As shown, deflector plate 13 causes the output flow of the cyclone or other pre-separator 11 to deflect, redistribute, and thereby enter the virtual impactor stage 12 in a uniform fashion. Without defector plate 13, the output from transition region 11b of pre-separator 11 would impinge directly on the center section of virtual impactor stage 12 where turbulence may cause loss of particulate sample, and fluctuating or non-uniform flow patterns to develop over accelerator jets 14. However, with deflector plate 13 in place, the deflected air can enters accelerator jets 14. Accelerator jets 14 feature a flow-straightening collar that causes the airflow to enter accelerator jets 14 smoothly and flow straight into the jet orifices and on into manifold 16. As is known from prior art, it is the diameter of these orifices that principally determines the 50% cut-point diameter of the impactor, which in the present application is approximately 2 micrometers aerodynamic diameter.

The major portion (typically 90%-95%) of the total flow exits from manifold 16 through exit ports 16*a*. This major flow contains most of the smaller, filter clogging, particles, and exhausted through port 17*a* in casing 17 by way of exhaust piping (not shown).

A minor portion (typically 5%-10%) of the total flow into manifold 16 is extracted through the flow restrictor elements l8*a*of receiver nozzles 18, and exits through flow restrictor elements 18*a*. The function of flow restrictor elements 18*a* is to provide a means to balance the minor flow evenly among the plurality of receiver nozzles 18. Each receiver nozzle 18 assembly faces a corresponding accelerator jet 14, and has an initial bore diameter only somewhat larger than the jet orifice diameter, but which expands to a much larger diameter. This larger diameter expansion section terminates at the point of insertion of a flow restrictor element having a tapered bore starting at the diameter of the expansion section and reducing to a much smaller bore, sized to create sufficient differential pressure to balance flow between the plurality of receiver nozzles 18, and shaped, along with flow restrictor elements 18*a*, to smoothly carry the separated larger particles in the minor flow through to a sample filter collection stage in the associated continuous air monitor with a minimum amount of wall deposition. The outer diameter of the restrictor elements 18*a* can be threaded (e.g., ¾ NF-16) to match a corresponding inner thread in receiver nozzles 18 so that restrictor elements 18*a* can be assembled and disassembled for maintenance and cleaning. This will be more fully described below.

FIG. 2*a* is a perspective view of the virtual impactor portion of the present invention and is better illustrated in a cross-sectional in FIG. 2*b*, and having the same numbers. In particular, FIG. 2*b* better illustrates the nature of accelerator jets 14 and receiver nozzles 18 with flow restrictor elements 18*a* attached, and with major flow exit ports 16*a* that allow the exhaust of the major flow.

The minor portion of the sampled air exiting the receiver nozzles 18 and flow restrictor elements 18*a*, containing the large particle load of the sampled air then is drawn down and through the sample collection filter of the continuous air monitor instrument for determination of whether dangerous materials are present. The minor flow volumetric rate is typically one-fifth to one-tenth of the total inlet sampling rate (e.g., 0.5-1.0 CFM out of 10 CFM intake). To illustrate, it has been found that a combination of 8 accelerator jets 14/receiver nozzles 18 pairs can be effectively used at total flow rate of 10 CFM (minor flow of 1 CFM) to achieve a cut point of approximately 2 micrometers AD. For other applications and higher flows, a different number of accelerator jets 14/receiver nozzles 18 would be necessary.

Referring now to FIGS. 3*a*, 3*b*, and 3*c*, receiver nozzle 18 is shown having an upper section illustrating a small diameter inlet bore, expanding to a larger bore such that wall deposition loss is minimized, and terminating in a threaded outlet to mate with a flow restriction element. In FIGS. 4*a*, 4*b*, and 4*c*, flow restriction 18*a* is shown, with inner diameter tapering from the expansion section of receiver nozzle 18 upper section down to an outlet diameter selected to create sufficient pressure drop that flows through all nozzles in a multi-nozzle array are uniform. The outer diameter of restriction element 18*a* can be threaded so that it will screw into the threaded base of a receiver nozzle 18.

The present invention, in addition to removing airborne debris as well as fine soil particles or smoke accompanying high wind in the open environment, also provides a benefit for environmental continuous air monitors designed to detect radioactive aerosols released to outdoor air. Since the particulate progeny arising from the decay of radon gas (i.e., atoms of Pb, Bi, and Po) are of molecular size or preferentially attached to fine dust particles, they would be separated and discarded along with smoke and other fine particles in this invention. This would have the effect of reducing the background count rate in radiation detectors used in radiological environmental continuous air monitors and improve performance. Finally, although clogging of environmental continuous air monitor filters is not totally eliminated with the present invention (some fine particles are invariably associated with the minor flow), the time between filter changes is considerably reduced.

It is the ability of the present invention to both effectively remove debris and coarse particles in ambient air for protection of subsequent stages of the apparatus, and effectively remove fine particles and smoke to protect the sample filter from premature failure that makes the invention so important to environmental continuous air monitoring. Although the sample filter is filtering air at a reduced rate (approximately 0.5-1 CFM), it is receiving nearly the entire quantity of such particles collected at 10 or 20 CFM, and thus the sensitivity for detection is correspondingly increased.

The foregoing description of the embodiments of the invention has been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An inlet for an environmental air monitor comprising:

a pre-separator stage for interfacing with ambient environment air and removing debris and insects commonly associated with high wind outdoors;

a deflector plate in communication with incoming air from said pre-separator stage, for directing said air radially and downward uniformly into a plurality of accelerator jets located in a manifold of a virtual impactor, said manifold being cylindrical and having a top, a base, and a wall, with said plurality of accelerator jets being located in said top of said manifold and receiving said directed air and accelerating said air, thereby creating jets of said directed air penetrating into said manifold, where a major flow is deflected to said walls of said manifold and extracted through ports in said walls, and;

a plurality of receiver nozzles located in said base of said manifold coaxial with said accelerator jets, and a plurality of matching flow restrictor elements in the plurality of receiver nozzles for balancing and equalizing the total minor flow among all the plurality of receiver nozzles, through which a lower, fractional flow extracts large particle constituents of said air for collection on a sample filter after passing through said plurality of receiver nozzles and said plurality of matching flow restrictor elements.

2. The apparatus as described in claim 1, wherein said pre-separator apparatus consists of a cyclone inlet.

3. The apparatus as described in claim 1, wherein said pre-separator consists of a baffled inlet stage.

4. The apparatus as described in claim 1, wherein said plurality of accelerator jets are composed of eight accelerator jets.

5. The apparatus as described in claim 1, wherein said plurality of receiver nozzles and said plurality of flow restrictor elements are composed of eight receiver nozzles and eight flow restrictor elements.

6. The apparatus as described in claim 1, wherein said plurality of flow restrictor elements have exterior threads to mate with interior threads in said plurality of receiver nozzles, enabling said plurality of flow restrictor elements to be removed for cleaning.

7. The apparatus as described in claim 1, wherein said pre-separator and said deflector plate are circular in shape and positioned to achieve uniform, radially distributed air from said pre-separator stage into said impactor stage.

* * * * *